US010310857B2

(12) United States Patent
Mittal

(10) Patent No.: US 10,310,857 B2
(45) Date of Patent: Jun. 4, 2019

(54) SYSTEMS AND METHODS FACILITATING MULTI-WORD ATOMIC OPERATION SUPPORT FOR SYSTEM ON CHIP ENVIRONMENTS

(71) Applicant: Ampere Computing LLC, Santa Clara, CA (US)

(72) Inventor: Millind Mittal, Palo Alto, CA (US)

(73) Assignee: AMPERE COMPUTING LLC, Santa Clara, CA (US)

( * ) Notice: Subject to any disclaimer, the term of this patent is extended or adjusted under 35 U.S.C. 154(b) by 240 days.

(21) Appl. No.: 14/264,716

(22) Filed: Apr. 29, 2014

(65) Prior Publication Data
US 2015/0324133 A1 Nov. 12, 2015

(51) Int. Cl.
G06F 9/38 (2018.01)
G06F 3/06 (2006.01)

(52) U.S. Cl.
CPC .......... G06F 9/3834 (2013.01); G06F 3/0613 (2013.01); G06F 3/0655 (2013.01); G06F 3/0671 (2013.01)

(58) Field of Classification Search
CPC ..... G06F 3/0613; G06F 3/0671; G06F 3/0655
See application file for complete search history.

(56) References Cited

U.S. PATENT DOCUMENTS

| 5,671,446 | A | 9/1997 | Rakity et al. |
| 7,502,826 | B2 | 3/2009 | Barron et al. |
| 8,024,522 | B1 | 9/2011 | Favor et al. |
| 8,346,975 | B2 | 1/2013 | Cardona et al. |
| 8,352,656 | B2 | 1/2013 | Saripalli |
| 8,521,963 | B1 | 8/2013 | Miao et al. |
| 8,549,249 | B1 | 10/2013 | Metcalf et al. |
| 8,578,380 | B1 | 11/2013 | Adams et al. |
| 8,612,711 | B1 | 12/2013 | Griffin |
| 8,682,877 | B2 | 3/2014 | Greiner et al. |
| 8,688,661 | B2 | 4/2014 | Greiner et al. |
| 2002/0083278 | A1* | 6/2002 | Noyes .................. G06F 9/3004 711/156 |
| 2003/0131205 | A1* | 7/2003 | Huck ................... G06F 9/3004 711/155 |
| 2004/0042251 | A1 | 3/2004 | Kang |

(Continued)

FOREIGN PATENT DOCUMENTS

WO 2011/065618 A1 6/2011

OTHER PUBLICATIONS

International Search Report & Written Opinion for PCT Application Serial No. PCT/US2015/042595, dated Apr. 19, 2016, 10 pages.

*Primary Examiner* — Michael Alsip
(74) *Attorney, Agent, or Firm* — Alston & Bird LLP

(57) ABSTRACT

Systems and methods that facilitate multi-word atomic operation support for systems on chip are described. One method involves: receiving an instruction associated with a calling process, and determining a first memory width associated with execution of the instruction based on an operator of the instruction and a width of at least one operand of the instruction. The instruction can be associated with an atomic operation. In some embodiments, the instruction contains a message having a first field identifying the operator and a second field identifying the operand.

18 Claims, 6 Drawing Sheets

(56) References Cited

U.S. PATENT DOCUMENTS

| | | | |
|---|---|---|---|
| 2006/0106994 A1* | 5/2006 | Corrigan | G06F 9/3004 711/144 |
| 2009/0086737 A1 | 4/2009 | Fairhurst et al. | |
| 2014/0089259 A1 | 3/2014 | Cheng | |
| 2014/0156907 A1 | 6/2014 | Palmer | |
| 2014/0181474 A1* | 6/2014 | Gewirtz | G06F 9/3004 712/206 |

\* cited by examiner

COMPLETION MESSAGE

| MESSAGE SEQUENCE NUMBER 402 | STATUS 404 | RETURN VALUE FOR FETCH-AND-ADD 406 |

SYSTEMS AND METHODS FACILITATING MULTI-WORD ATOMIC OPERATION SUPPORT FOR SYSTEM ON CHIP ENVIRONMENTS

TECHNICAL FIELD

The subject disclosure relates generally to systems-on-chips (SoCs), and more particularly to systems and methods facilitating multi-word atomic operating support for SoCs.

BACKGROUND

Advancements in computing technology and a need for greater data management have led to an increase in fabrication of SoC integrated circuits. SoCs typically integrate several components of a computer on a single chip substrate. Specifically, SoCs integrate analog, mixed-signal, digital and/or radio frequency circuitry on a single chip substrate, and can increase processing power by using multiple processors and an on-chip interconnection.

Different types of central processing unit (CPU) instructions can be executed within the SoC architecture. Atomicity in execution of operations is desirable as consumers of data may read an intermediate, erroneous value of a non-atomic operation if reading is performed during execution.

The above information is merely intended to provide a contextual overview of aspects of multiprocessor systems and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an embodiment, a method involves: receiving, at a processor, an instruction associated with a calling process; and determining a first memory width associated with an operator of the instruction and a width of at least one operand of the instruction.

In another embodiment, a computer method implemented in an SoC is provided. The computer method involves: receiving information indicative of an instruction associated with a calling process; and determining a first memory width associated with execution of the instruction.

In another embodiment, a system on chip comprises: a central processing unit configured to execute an instruction associated with a calling process; and an atomic engine component. The atomic engine component is coupled to the central processing unit and configured to: receive the instruction; and determine a first memory width associated with execution of the instruction, based on an operator of the instruction and a width of at least one operand of the instruction.

One or more embodiments can advantageously provide multi-word atomic operation support for system memory and/or for SoC memory. For example, multi-word atomic operation can be facilitated for tables in SoC memory. As used herein, an "atomic" operation is a CPU instruction that executes in a single CPU cycle and/or a CPU instruction for which an operation will complete execution without being interrupted by the actions of another thread. One or more of the embodiments described herein can be employed in or to provide any number of different systems including, but not limited to, data center computers, cloud computing systems, embedded communication processors, enterprise servers (e.g., multiple CPU server systems) or the like.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

BRIEF DESCRIPTION OF THE DRAWINGS

FIG. 4 is a block diagram illustrating an example, non-limiting embodiment of a completion message facilitating multi-word atomic operations support in an SoC in accordance with one or more aspects described herein.

DETAILED DESCRIPTION

Figure 1:
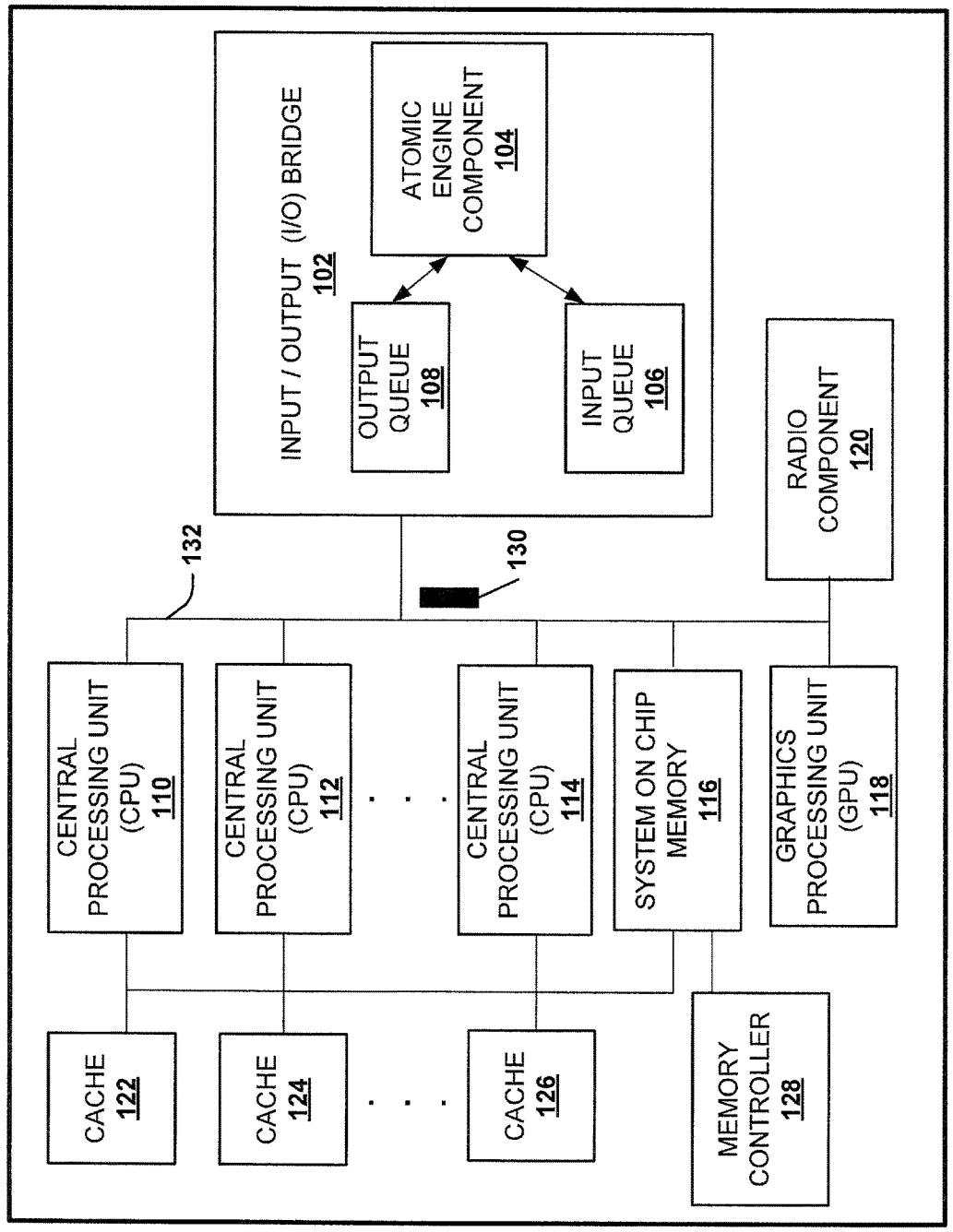
FIG. 1 is a block diagram illustrating an example, non-limiting embodiment of an SoC for which multi-word atomic operation support can be facilitated in accordance with one or more aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

FIG. 1 is a block diagram illustrating an example, non-limiting embodiment of an SoC for which multi-word atomic operation support can be facilitated in accordance with one or more aspects described herein. As used herein, the term "multi-word" atomic operation support means atomic operation support employing a memory location that has a width greater than one word (i.e., 16 bits or 2 bytes). Some embodiments described herein can provide atomic operation support employing a memory location that has a width less than or equal to one word. FIG. 1 is a simplified subset of select components of SoC shown merely for providing context for the embodiments described herein. In various embodiments, alternative or additional components can be included in SoC 100. As used herein, an SoC can be or include server and/or general processor functionality.

As shown, SoC 100 includes one or more CPUs 110, 112, 114, SoC memory 116, graphics processing unit (GPU) 118, radio component 120, caches 122, 124, 126, memory controller 128 and/or input/output (I/O) bridge 102. There is no particular limit to the number of CPUs. In various embodiments, one or more of CPUs 110, 112, 114, SoC memory 116, GPU 118, radio component 120, caches 122, 124, 126, memory controller 128 and/or I/O bridge 102 can be electrically and/or communicatively coupled to one another to facilitate multi-word atomic operation on SoC 100.

CPUs 110, 112, 114 can be communicatively coupled to respective caches 122, 124, 126 and/or SoC memory 116. Caches 122, 124, 126 can store data duplicating one or more values of data stored in SoC memory 116 in various embodiments.

SoC memory 116 can be any number of different types of memory including, but not limited to, read only memory (ROM), random access memory (RAM), flash memory and/or electrically erasable programmable read only memory (EEPROM). In some embodiments, SoC memory 116 can be a computer-readable storage medium storing instructions, computer code and/or functions executable by CPUs 110, 112, 114. For example, SoC memory 116 can store instructions, computer code and/or functions executable by CPUs 110, 112, 114 described herein to facilitate multi-word atomic operation support. Memory controller 128 includes circuitry that manages and/or controls the flow of data to and/or from SoC memory 116. For example, memory controller 128 includes logic for reading from and/or writing to SoC memory 116.

CPUs 110, 112, 114 can include circuitry configured to fetch data from respective caches 122, 124, 126 and/or SoC memory 116, and perform one or more arithmetic or logical operations on the fetched data. In some embodiments, each CPU has a corresponding cache, while in other embodiments, a subset of CPUs have a corresponding cache. In various embodiments, CPUs 110, 112, 114 can be a processor designed by ARM Holdings or a processor having x86 architecture. In one embodiment, for example, one or more of CPUs 110, 112, 114 can be 64-bit server on chip processors designed by ARM Holdings configured to provide server functionality via SoC 100. For example, in some embodiments, SoC 100 can serve data to one or more clients. In other examples, SoC 100 can be or be included in data center computers, cloud computing systems, embedded communication processors, enterprise servers (e.g., multiple CPU server systems) or the like.

Radio component 120 can include circuitry configured to transmit and/or receive radio frequency (RF) signals to and/or from SoC 100. In various embodiments, radio component 120 can operate according to any number of different telecommunication protocols for communication of voice, video and/or data traffic. For example, radio component 120 can operate according to Wireless Fidelity (Wi-Fi), 4G Long-Term Evolution (LTE) and/or BLUETOOTH® protocols. GPU 118 can include circuitry to process graphics information and/or create visual images for output to a display component of a device associated with SoC 100.

I/O Bridge 102 can include circuitry facilitating communication between the CPU and/or one or more components on SoC 100. In some embodiments, I/O Bridge 102 can also include circuitry facilitating communication between SoC 100 and one or more peripheral components communicatively coupled to SoC 100. In some embodiments, for example, I/O Bridge 102 includes a Northbridge component (not shown) that facilitates communication between CPUs 110, 112, 114 and one or more other components of SoC 100. I/O Bridge 102 can also include circuitry providing a Southbridge component (not shown) that facilitates I/O functionality between SoC 100 and one or more peripheral components that can be communicatively coupled to SoC 100.

As also shown in FIG. 1, I/O Bridge 102 also includes AE component 104. AE component 104 includes circuitry that can perform one or more operations to facilitate multi-word atomic support for SoC 100. Input queue 106 and output queue 108 can be communicatively coupled to AE component 104 and/or any number of components of SoC 100 to facilitate processing by AE component 104 for provisioning of the multi-word atomic operation support on SoC 100.

AE component 104 will be described in greater detail with reference to FIGS. 1, 2, 3, 4 and 5. AE component 104 can include circuitry for receiving, via interface 132, data 130 associated with a calling process. Data 130 can be output to interface 132 from one of CPUs 110, 112, 114. In some embodiments, data 130 can include information indicative of an instruction associated with a calling process.

Figure 2:
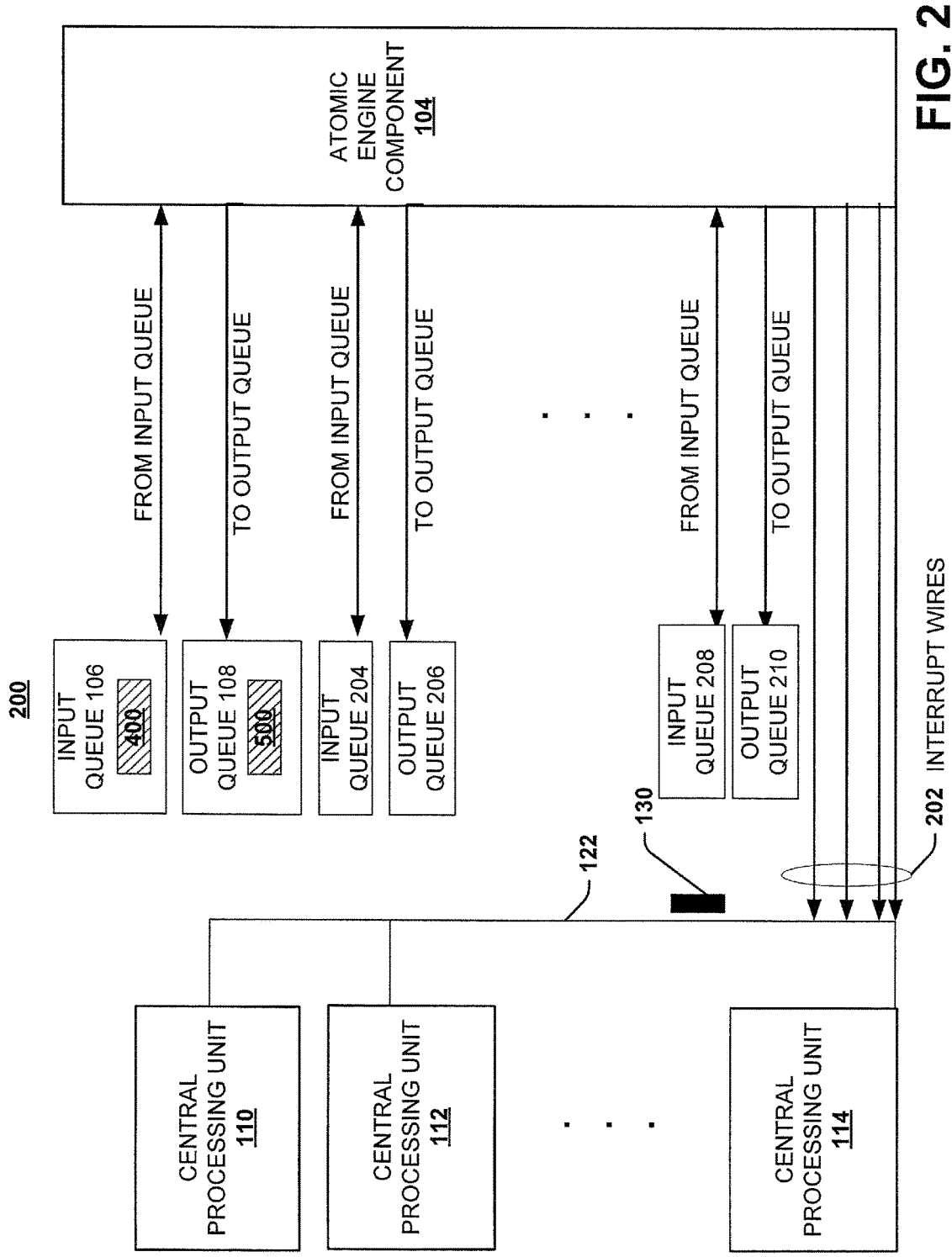
FIG. 2 is a block diagram illustrating an example, non-limiting embodiment of an interface system between CPUs and an atomic engine (AE) component of an SoC facilitating multi-word atomic operation support in accordance with one or more aspects described herein.

Turning now to FIG. 2, shown is a block diagram illustrating an example, non-limiting embodiment of an interface system between CPUs and an AE component of an SoC facilitating multi-word atomic operation support in accordance with one or more aspects described herein. Repetitive description of like elements employed in respective embodiments of systems and/or apparatus described herein are omitted for sake of brevity.

An I/O agent of AE component 104 can receive data 130 for processing. In some embodiments, eight input/output queue pairs can be provided between CPUs 110, 112, 114 and AE component 104. In other embodiments, any number of input/output queue pairs can be provided between CPUs 110, 112, 114 and AE component 104. For example, more input/output queue pairs can be provided to provide atomic operation support for SoCs facilitating data-intensive functionality.

After receipt of data 130 (e.g., the instruction associated with the calling process), AE component 104 can identify one or more operators and one or more operands of the instruction. For example, AE component 104 can evaluate the information indicative of the instruction and determine the number and/or type of operands embodied in the instruction and/or the number or width of the operands embodied in the instruction. By way of example, but not limitation, the instruction can include a Fetch-and-Add operator and an operand having a value indicative of amount to be added to an existing value in a designated memory location.

In some embodiments, AE component 104 can place information indicative of the instruction, information indicative of one or more operators and/or information indicative of one or more operands in input queue 106. In some embodiments, input queue 106 is a First in, First out (FIFO) queue. Accordingly, in these embodiments in which input queue 106 is a FIFO queue, instructions can be processed in the order in which they were received with the oldest instruction received being processed before the more-recently received instructions. In some embodiments, input queue 106 can be a work queue that can receive one or more scheduled tasks/services associated with the instruction.

Figure 3:
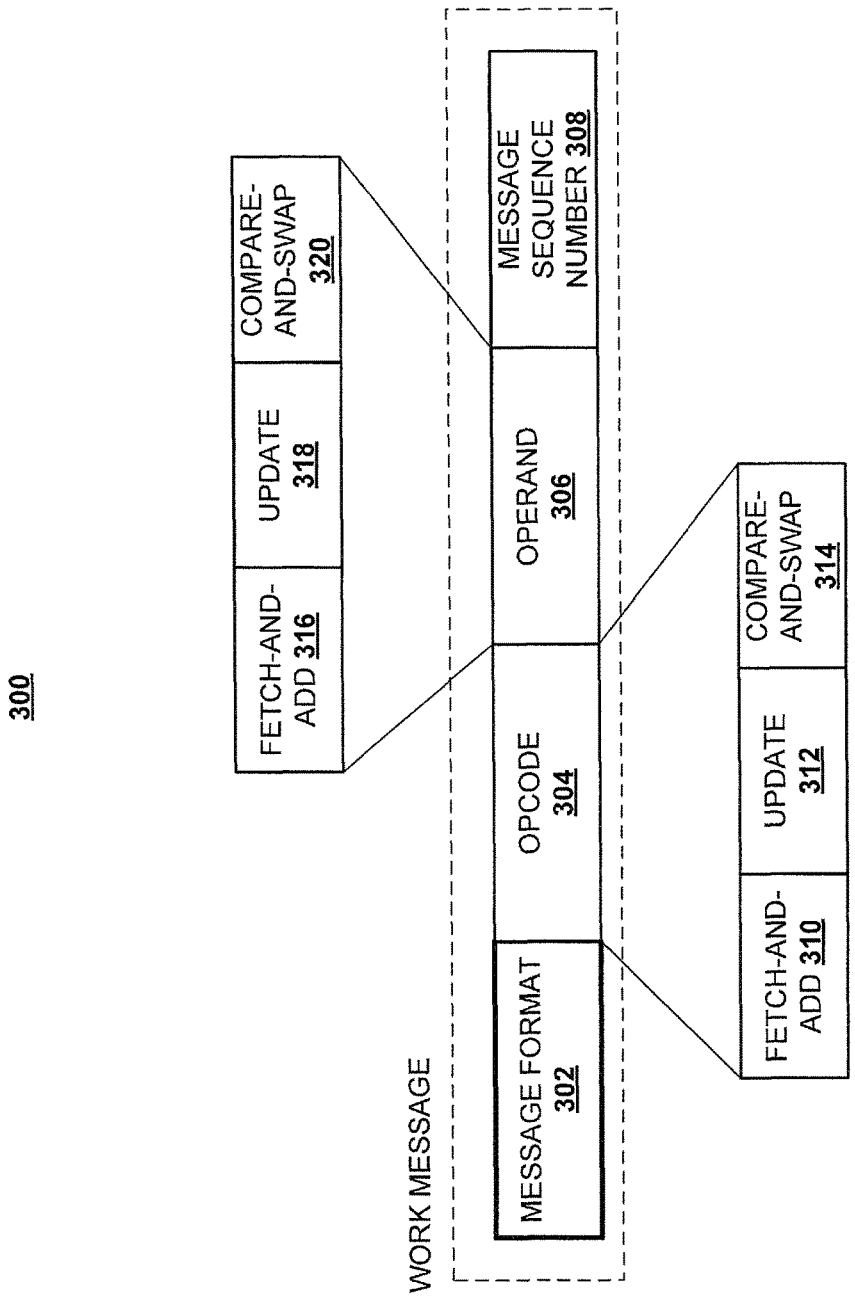
FIG. 3 is a block diagram illustrating an example, non-limiting embodiment of a work message facilitating multi-word atomic operation support in an SoC in accordance with one or more aspects described herein.

An example of the information output to input queue 106 by AE component 104 can be as shown and described with reference to FIG. 3. FIG. 3 is a block diagram illustrating an example, non-limiting embodiment of a format for a work message facilitating multi-word atomic operation support in an SoC in accordance with one or more aspects described herein. Repetitive description of like elements employed in respective embodiments of systems and/or apparatus described herein are omitted for sake of brevity.

Turning to FIG. 3, one or more portions of the instruction received by AE component 104 can include the format or content shown as work message 300. In some embodiments, the interface between CPU 110 and AE component 104 can be AtomicUpdateCmd Message based.

In some embodiments, work message 300 can be 32 bytes long while, in other embodiments, work message 300 can be 64 bytes long. Work message 300 can include a number of different fields, which can be in any order and/or can be adjacent or non-adjacent one another. The embodiment of work message 300 shown includes message format field 302, opcode field 304, operand field 306 and message sequence number (MSN) field 308.

Message format field 302 can be provided in a byte of information of work message 300. For example, message format field can be the first byte of information in work message 300, and can describe the layout (e.g., number of bytes, etc.) of work message 300.

Opcode field 304 can include information specifying one or more operations to be performed as part of the instruction. The operations can be extracted from work message 300 by AE component 104 and identified as operations to be performed via the instruction. In the example shown, opcode field 304 includes a Fetch-and-Add CPU instruction 310, an Update CPU instruction 312 and a Compare-and-Swap CPU instruction 314. In other embodiments, one or more of the instructions can be provided in opcode field 304 and/or one or more different instructions can be provided in opcode field 304. In various embodiments, instructions indicated in opcode field 304 can be atomic instructions.

Fetch-and-Add CPU instruction 310 is an atomic instruction that can increment the contents of a memory location. For example, the memory location can be specified by an address and the Fetch-and-Add CPU instruction 310 can atomically modify the information at the memory location. A Fetch-and-Add CPU instruction 310 increments the value at the memory location by an amount indicated by the Fetch-and-Add operand 316 within operand field 306.

In some embodiments, the Fetch-and-Add CPU instruction 310 can be 16 bytes in embodiments in which the work message format 300 is 32 bytes long. The 16 bytes Fetch-and-Add CPU instruction 310 can include a Fetch-and-Add 0 CPU instruction (not shown), which can be employed for an atomic read while an Ld SIMD can be employed for 128 bit read from a memory location. As used herein, "Ld" represents a load instruction and "SIMD" represents a single instruction multiple data operation.

In some embodiments, as shown, opcode field 304 can also include an Update CPU instruction 312 and a Compare-and-Swap CPU instruction 314. Update CPU instruction 312 can update information at a memory location with a new value indicated by the information stored at Update operand 318.

Compare-and-Swap CPU instruction 314 can be an atomic instruction that can compare the contents of a memory location to a given value and, only if the value and the contents of the memory location are the same, store a third value into the memory location.

Operand field 306 can include a Fetch-and-Add CPU operand 316, Update operand 318 and/or Compare-and-Swap CPU operand 320. The operand can be one or more values employed in executing the corresponding CPU instruction indicated by opcode 304.

In some embodiments, Fetch-and-Add operand can be 16 bytes long with a 42 bit pointer in some embodiments. The Update operand 318 can be from five bytes to 48 bytes in some embodiments. In some embodiments, Update operand 318 can be larger if necessary. The start pointer can be 41 bytes long in some embodiments.

In some embodiments, the Compare-and-Swap operand 320 can be the value with which the value in the memory location is compared and/or the new value that is provided in the memory location if the values are the same. The Compare-and-Swap operand 320, can be from five bytes to 48 bytes (or larger if necessary). The start pointer can be 41 bytes long and the swap data can be up to 48 bytes long. The pointer to the compare data can be 41 bytes long MSN field 308 can include information indicative of a sequence number of the message. MSN field 308 can be 15 bytes long in some embodiments. In some embodiments, the information stored at MSN field 308 can be employed to determine the position of work message 300 in a set of work messages in input queue 106.

As a function of the determined width, the I/O agent of AE component 104 can reserve (or place a hold) and/or lock a memory location. The AE component 104 can determine the width of the memory location based on the width of one or more of the operands in some embodiments. For example, AE component can select a width for the memory location that is greater than or equal to the width of the operand.

For example, AE component 104 can evaluate the one or more operators (e.g., addition operator associated with Fetch-and-Add CPU instruction) for the instruction and the width of one or more of the operands (e.g., Fetch-and-Add operand 316) and determine a width of a memory location for reservation by AE component 104. For example, in some embodiments, AE component 104 can reserve and lock a memory location of one or more of cache 122, 124, 126 and/or SoC memory 116 (or one or more tables of SoC memory 116) having a width that is greater than or equal to the width of one or more of the operands. In other embodiments, AE component 104 can reserve and lock a memory location of cache 122, 124, 126 and/or SoC memory 116 having a width that is greater than or equal to the width of the result of execution of the instruction.

In some embodiments, AE component 104 can determine the width of the memory location based on the width of one or more of the operands and at least one operator of the instruction. For example, AE component can select a width for the memory location that is greater than or equal to the width of the result of applying the operator to one or more operands.

In some embodiments, AE component 104 can determine the width of the memory location based on the width of the result of executing the instruction. For example, AE component can select a width for the memory location that is greater than or equal to the width of the result of executing the instruction.

In various different embodiments, the width of the memory location determined by AE component 104 for reservation and/or locking has a width greater than one word, equal to one word or less than one word. Accordingly, a memory location having width of multiple word lengths can be reserved to facilitate atomic operation support on the SoC (e.g., SoC 100).

AE component 104 can apply the one or more operators to the one or more operands of the instruction and output the result to output queue 108. In some embodiments, AE component 104 can execute the instruction and output the result to output queue 108. In either embodiment, the result can be output for collection by the calling process associated with the instruction.

In some embodiments, the result can be output in the form of (e.g., including one or more of the fields of) completion message 400. FIG. 4 is a block diagram illustrating an example, non-limiting embodiment of a completion message facilitating multi-word atomic operation support in an SoC in accordance with one or more aspects described herein. Repetitive description of like elements employed in respective embodiments of systems and/or apparatus described herein are omitted for sake of brevity.

As shown in FIG. 4, completion message 400 can include MSN field 402, status field 404 and/or return value for Fetch-and-Add CPU instruction 406. In some embodiments, the MSN field 402 includes information indicative of the message number. Completion message format 400 can be 64 bytes long in some embodiments to provide efficiency for the memory interface.

One or more of the embodiments described herein can extend the typical architecture that employs the use of eight byte counters to 16 byte counters to 64 byte counters in various embodiments. By way of example, but not limitation, embodiments described herein can atomically read, modify and write data a substantial number of bytes to facilitate data sharing operations.

In some embodiments, for example, an atomic update can be performed to 128 bit counters. In some embodiments, an atomic update can be performed to forwarding or access control list (ACL) table where there is a set of fields that have to be updated atomically. The ACL table can be a table in the memory that includes a list of permissions associated with an object. The ACL can indicate which users or processes are granted access to a particular object and/or the operations that can be performed on a particular object.

Turning back to FIG. 2, one or more interrupt wires 202 or one or more interrupt messages can be employed to transmit notification from AE component 104 to a processor (e.g., one or more of CPUs 110, 112, 114) that one or more responses have been placed in an output queue (e.g., one or more of output queues 108, 206).

With reference to FIGS. 1 and 2, one or more embodiments described herein can allow memory controller 128 to maintain access granularity of 64 bytes while cache coherency is also maintained at a granularity of 64 bytes. Any one of CPUs 110, 112, 114 reading any part of 64 bytes of information from respective caches 122, 124, 126 goes through a coherence protocol for that line. In various different embodiments, any number of different coherence protocols can be employed for the embodiments described herein. If any cache has the line in modified state, the line is provided by the cache and not memory controller 128. Similar to I/O Bridge 102, AE component 104 can perform cache coherency protocol for coherent requests to SoC memory 116 and/or system memory (not shown).

Figure 5:
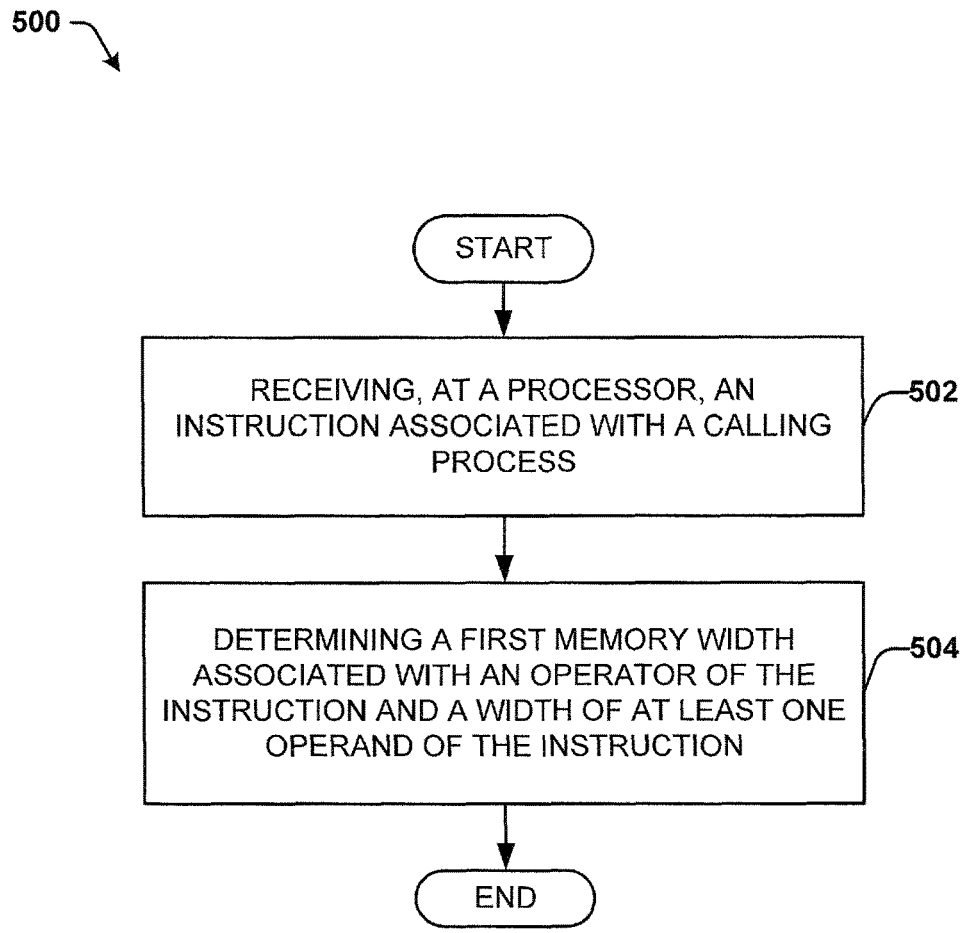
FIG. 5 illustrates a flow diagram of an example, non-limiting embodiment of a method facilitating multi-word atomic operation support in an SoC in accordance with an aspect described herein.

FIG. 5 illustrates a flow diagram of an example, non-limiting embodiment of a method facilitating multi-word atomic operation support in an SoC in accordance with an aspect described herein. As shown, at 502, method 500 can include receiving, at a processor, an indicative associated with a calling process. For example, in some embodiments, with reference to FIG. 3, the instruction can be or be included in work message 300. The instruction can include one or more operators and one or more operands. In some embodiments, the information indicative of the instruction can be stored in a FIFO input queue prior to the determination at 504 of method 500.

At 504, method 500 can include determining a first memory width associated with an operator of the instruction and a width of at least one operand of the instruction. For example, from the input queue, the I/O agent of the AE component can identify the operator and the widths of the one or more operands necessary for execution of the instruction. A memory location having a second memory width can then be reserved. In some embodiments, the second memory width is substantially equal to or greater than the first memory width. In some embodiments, the second memory width is substantially equal to or greater than a word width. The result of applying the operator to the operand can be output for collection by the calling process. For example, with reference to FIGS. 3 and 4, AE component 104 can apply the operator (e.g., indicated in opcode fields 310, 312, 314) to the one or more operands (e.g., indicated in operand fields 316, 318, 320) and place the result of the application of the operator to the one or more operands in an output queue for collection by the calling process.

Example Computing Environment

Figure 6:
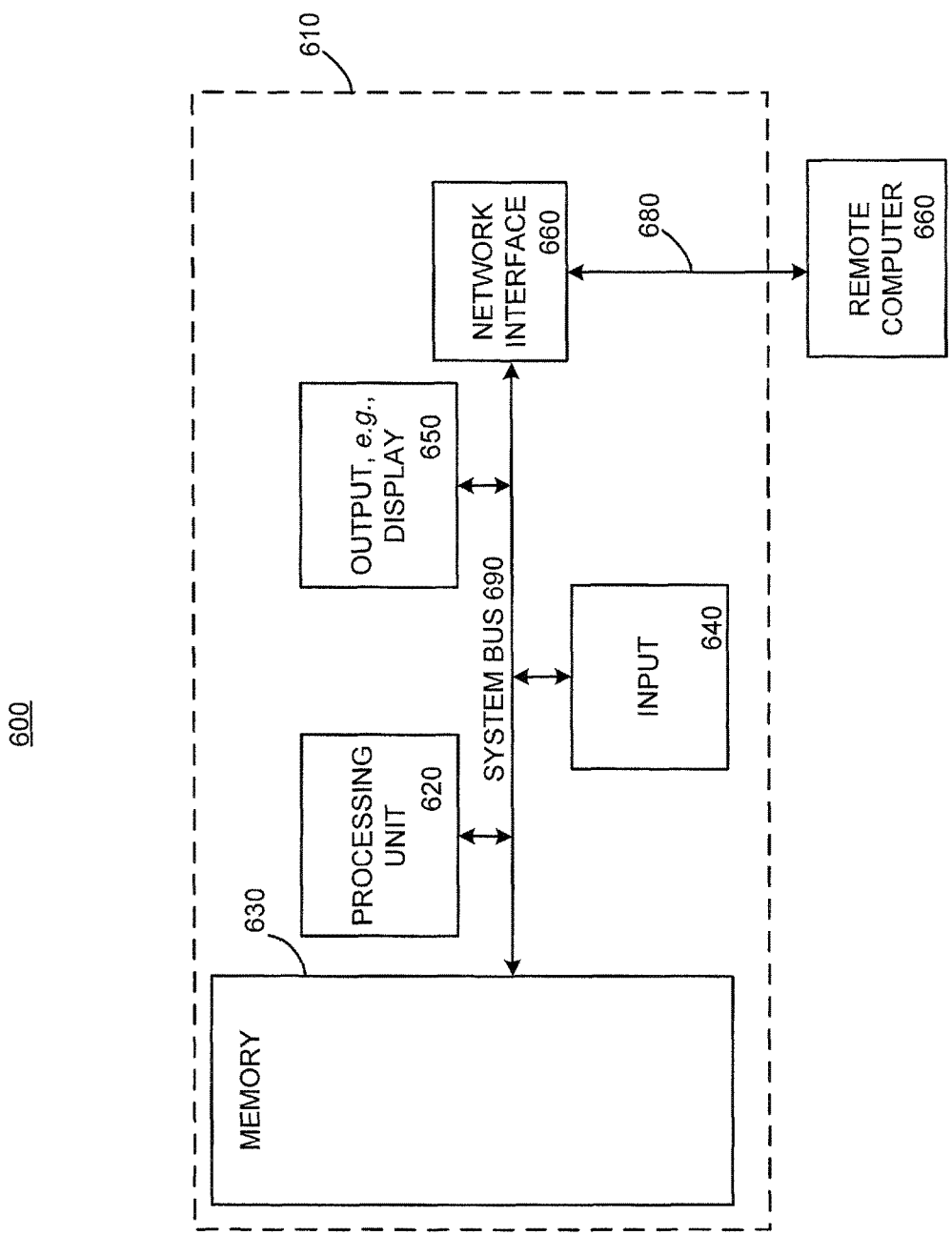
FIG. 6 illustrates a block diagram of an example electronic computing environment that can be implemented to facilitate multi-word atomic operation support in an SoC in conjunction with one or more aspects described herein.

As mentioned, advantageously, the techniques described herein can be applied to any device and/or network in which multi-word atomic operation support is desirable in a multiprocessor system. It is to be understood, therefore, that handheld, portable and other computing devices and computing objects of all kinds are contemplated for use in connection with the various non-limiting embodiments, e.g., anywhere that a device may wish to implement power management for a multiprocessor system. Accordingly, the below general purpose remote computer described below in FIG. 6 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 6 illustrates a block diagram of an example electronic computing environment that can be implemented to facilitate multi-word atomic operation support in a SoC in conjunction with one or more aspects described herein. FIG. 6 therefore illustrates an example of a suitable computing system environment 600 in which some aspects of the disclosed subject matter can be implemented, although as made clear above, the computing system environment 600 is only one example of a suitable computing environment for a device and is not intended to suggest any limitation as to the scope of use or functionality of the disclosed subject matter. Neither should the computing environment 600 be interpreted as having any dependency or requirement relating to any one or combination of components illustrated in the exemplary operating environment 600.

With reference to FIG. 6, an exemplary device for implementing the disclosed subject matter includes a general-purpose computing device in the form of a computer 610. Components of computer 610 may include, but are not limited to, a processing unit 620, a memory 630, and a system bus 690 that couples various system components including the system memory to the processing unit 620. The system bus 690 may be any of several types of bus structures including a memory bus or memory controller, a peripheral bus, and a local bus using any of a variety of bus architectures.

Computer 610 typically includes a variety of computer readable media. Computer readable media can be any available media that can be accessed by computer 610. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, compact disk read only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer 610.

Communication media typically embodies computer readable instructions, data structures, program modules, or other data in a modulated data signal such as a carrier wave or other transport mechanism and includes any information delivery media.

The memory 630 may include computer storage media in the form of volatile and/or nonvolatile memory such as ROM and/or RAM. A basic input/output system (BIOS), containing the basic routines that help to transfer information between elements within computer 610, such as during start-up, may be stored in memory 630. Memory 630 typically also contains data and/or program modules that are immediately accessible to and/or presently being operated on by processing unit 620. By way of example, and not limitation, memory 630 may also include an operating system, application programs, other program modules, and program data.

The computer 610 may also include other removable/non-removable, volatile/nonvolatile computer storage media. For example, computer 610 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 690 through a non-removable memory interface such as an interface, and a magnetic disk drive or optical disk drive is typically connected to the system bus 690 by a removable memory interface, such as an interface.

A user can enter commands and information into the computer 610 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 620 through user input 640 and associated interface(s) that are coupled to the system bus 690, but may be connected by other interface and bus structures, such as a parallel port, game port, or a universal serial bus (USB). A graphics subsystem can also be connected to the system bus 690. A projection unit in a projection display device, or a heads up display (HUD) in a viewing device or other type of display device can also be connected to the system bus 690 via an interface, such as output interface 650, which may in turn communicate with video memory. In addition to a monitor, computers can also include other peripheral output devices such as speakers which can be connected through output interface 650.

The computer 610 can operate in a networked or distributed environment using logical connections to one or more other remote computer(s), such as remote computer 670, which can in turn have media capabilities different from device 610. The remote computer 670 can be a personal computer, a server, a router, a network personal computer (PC), a peer device, personal digital assistant (PDA), cell phone, handheld computing device, a projection display device, a viewing device, or other common network node, or any other remote media consumption or transmission device, and may include any or all of the elements described above relative to the computer 610. The logical connections depicted in FIG. 6 include a network 680, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 610 can be connected to the LAN 680 through a network interface or adapter. When used in a WAN networking environment, the computer 610 can typically include a communications component, such as a modem, or other means for establishing communications over the WAN, such as the Internet. A communications component, such as wireless communications component, a modem and so on, which can be internal or external, can be connected to the system bus 690 via the user input interface of input 640, or other appropriate mechanism. In a networked environment, program modules depicted relative to the computer 610, or portions thereof, can be stored in a remote memory storage device. It will be appreciated that the network connections shown and described are exemplary and other means of establishing a communications link between the computers can be used.

Reference throughout this specification to "one embodiment," "an embodiment," "an example", "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one example," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A method, comprising:
receiving, at a processor, data defining an instruction associated with a calling process, wherein the processor is operably coupled to an atomic engine component having circuitry configured to perform one or more operations to facilitate multi-word atomic support for a system on chip, and the data comprises an opcode field defining a plurality of operations to be performed in accordance with the instruction and an operand field defining a plurality of values used to execute the plurality of operations;
determining a first memory width associated with execution of the instruction based on identities of the plurality of operators defined in the opcode field and a plurality of widths of the plurality of values defined in the operand field, wherein the determining the first memory width comprises:
determining, based on analysis of the data, a quantity of the plurality of values defined in the operand field and types of the plurality of values defined in the operand field; and
determining the first memory width as a function of the quantity and the type; and
reserving a memory location comprising a second memory width that is greater than the first memory width.

2. The method of claim 1, further comprising:
outputting result data representing a result of applying the plurality of operators to the plurality of values defined by in the operand field for collection by the calling process.

3. The method of claim 1, further comprising: storing the data in a First in, First out input queue.

4. The method of claim 1, wherein the data further comprises a message sequence number field identifying a sequence number for the instruction.

5. A system on chip, comprising:
a central processing unit configured to execute an instruction defined by message data associated with a calling process, the message data comprising an opcode field defining a plurality of operations to be performed in accordance with the instruction and an operand field defining a plurality of values used as operands for the plurality of operations; and
an atomic engine component coupled to the central processing unit and configured to:
receive the message data;

determine a first memory width associated with execution of the instruction based on types of the plurality of operations defined by the opcode field and widths of the plurality of values defined by the operand field, wherein the atomic engine component is further configured to determine the first memory width by:
  determining based on analysis of the message data, a quantity of the plurality of values defined by the operand field and types of the plurality of values defined by the operand field; and
  determining the first memory width as a function of the quantity and the type; and
reserve and lock a memory location comprising a second memory width that is greater than the first memory width,
wherein the atomic engine component comprises circuitry configured to perform the plurality of operations as multi-word atomic operations on a memory of the system on chip.

6. The system on chip of claim 5, wherein the atomic engine component is further configured to:
  output data indicative of a result of executing the instruction for collection by the calling process.

7. The system on chip of claim 5, wherein the message data further comprises a field identifying a sequence number for the message data.

8. The system of chip of claim 5, wherein the atomic engine component is further configured to:
  determine, based on analysis of the message data, at least one of a number of the plurality of values defined by the operand field or a type of the plurality of values defined by the operand field, and
  determine the first memory width based on at least one of the number of the plurality of values or the type of the plurality of values.

9. A method comprising:
  receiving, by a system-on-chip, information defining an instruction associated with a calling process, the information comprising an opcode field defining a plurality of operations to be performed as part of the instruction and an operand field defining a plurality of values used to execute the plurality of operations;
  determining, by the system-on-chip, a first memory width associated with execution of the instruction based on identities of the plurality of operations defined by the opcode field and widths of the plurality of values defined by the operand field, wherein the determining comprises:
    determining, based on analysis of the information, a quantity of the plurality of values defined by the operand field and types of the plurality of values defined by the operand field, and
    determining the first memory width as a function of the quantity and the type; and
  locking, by the system-on-chip, a memory location comprising a second memory width that is greater than the first memory width, wherein the system-on-chip comprises circuitry configured to perform one or more operations to facilitate multi-word atomic support for the system on chip.

10. The method of claim 9, further comprising:
  outputting the instruction to an input queue prior to the reserving and locking, wherein the input queue is a First in, First out input queue.

11. The method of claim 9, further comprising:
  outputting the instruction to an input queue prior to the reserving and locking, wherein the input queue is a work input queue.

12. The method of claim 1, wherein the plurality of operators comprise at least a first atomic instruction that increments contents of a first memory location by a first value of the plurality of values and a second atomic instruction that compares contents of a second memory location to a second value of the plurality of values and stores a third value in the second memory location based on a determination that the second value and the contents of the second memory location are equal.

13. The system on chip of claim 5, further comprising:
  a second central processing unit;
  a plurality of interrupt wires connecting the atomic engine component to the central processing unit and the second central processing unit; and
  a plurality of pairs of input and output queues coupled between the atomic engine component and the central processing unit and between the atomic engine component and the second central processing unit, wherein the atomic engine component is further configured to:
  output information indicative of the instruction, the plurality of operators, and the plurality of values in an input queue of a pair of the pairs of input and output queues.

14. The system on chip of claim 13, wherein the input queue is further configured to receive one or more scheduled tasks associated with the instruction.

15. The system on chip of claim 13, wherein the information is formatted as a work message facilitating the multi-word atomic operations.

16. The system on chip of claim 5, wherein the plurality of operations comprise at least
  a first atomic instruction that increments a content of a first memory location by a first value of the plurality of values, and
  a second atomic instruction that compares a content of a second memory location to a second value of the plurality of values and stores a third value in the second memory location based on a determination that the second value and the content of the second memory location are equal.

17. The method of claim 9, further comprising executing the plurality of operations using the plurality of values as operands, wherein the executing comprises at least one of:
  executing a first of the plurality of operations that increments a first content of a first memory location by a first value of the plurality of values, and
  executing a second of the plurality of operations that compares a second content of a second memory location with a second value of the plurality of values and stores a third value in the second memory location based on a determination that the second value and the second content of the second memory location are equal.

18. The method of claim 9, further comprising outputting result data representing a result of executing the instruction for collection by the calling process.

* * * * *